(12) United States Patent
Bielefeld et al.

(10) Patent No.: US 6,787,775 B1
(45) Date of Patent: Sep. 7, 2004

(54) PORTABLE THERMAL IMAGER WITH A SHOCK-ABSORBING LENS MOUNT

(75) Inventors: Eric Bielefeld, Lexington, KY (US); Richard Alan Oleson, Lexington, KY (US)

(73) Assignee: E.D. Bullard Co., Cynthiana, KY (US)

( * ) Notice: Subject to any disclaimer, the term of this patent is extended or adjusted under 35 U.S.C. 154(b) by 187 days.

(21) Appl. No.: 10/202,249

(22) Filed: Jul. 24, 2002

Related U.S. Application Data

(60) Provisional application No. 60/308,310, filed on Jul. 27, 2001.

(51) Int. Cl.[7] .................................................. G01J 5/08
(52) U.S. Cl. ........................ 250/330; 250/353; 359/819
(58) Field of Search ............................... 250/330, 353; 359/819, 808, 811

(56) References Cited

U.S. PATENT DOCUMENTS

| | | | | |
|---|---|---|---|---|
| 3,489,008 A | * | 1/1970 | Boong et al. | ................ 250/353 |
| 6,292,311 B1 | * | 9/2001 | Bohn et al. | ................ 359/819 |
| 6,486,473 B2 | * | 11/2002 | Salapow et al. | |
| 2002/0162963 A1 | * | 11/2002 | Lannestedt et al. | ......... 250/353 |

* cited by examiner

*Primary Examiner*—Constantine Hannaher
(74) *Attorney, Agent, or Firm*—Stites & Harbison, PLLC; David W. Nagle, Jr.

(57) ABSTRACT

A portable thermal imager has a shock-absorbing lens mount that minimizes the transfer of the impact forces to the fragile lens. The lens of the portable thermal imager is encased within a circumferential grommet and then received in a cavity defined by the housing such that the lens is essentially suspended within the cavity. Since the lens is essentially suspended, little or no force is translated to the lens if the thermal imager is dropped or otherwise impacted.

5 Claims, 3 Drawing Sheets

PORTABLE THERMAL IMAGER WITH A SHOCK-ABSORBING LENS MOUNT

CROSS REFERENCE TO RELATED APPLICATION

This application claims priority from U.S. Provisional Application Serial No. 60/308,310 filed Jul. 27, 2001, and relates to a portable thermal imager with a shock-absorbing lens mount. The entire disclosure contained in U.S. Provisional Application Serial No. 60/308,310 is incorporated herein by this reference.

BACKGROUND OF THE INVENTION

The present invention relates to a portable thermal imager, a device that is commonly used by firefighters and other rescue personnel to identify the seat of a fire from outside of a burning structure, to identify fire conditions within a burning structure hidden by heavy smoke, and/or to identify victims trapped within a burning structure. Specifically, the present invention relates to a portable thermal imager with a shock-absorbing lens mount that minimizes the transfer of impact forces to the fragile lens, such as when the thermal imager is dropped.

Thermal imagers, also referred to as thermal imaging cameras, were introduced to firefighters in the mid-1990's. Originally developed for military applications, thermal imagers quickly proved to be a valuable fire-fighting tool, essentially allowing firefighters to "see" in dark, smoke-filled and other extreme environments.

Thermal imagers can be used by firefighters in numerous applications, including: to identify the seat of the fire from outside of a burning structure, thereby allowing the incident commander to determine what resources will be necessary and how to deploy such resources; to identify fire conditions and "hot spots" within a burning structure hidden by heavy smoke or building design features; and to identify victims trapped within a burning structure despite potentially blinding smoke conditions. Furthermore, thermal imagers have been used to identify alternate egress routes for rapid and safe extraction of victims; to observe the impact of the water application on the heat and fire conditions; to identify areas within a burning structure with extremely high heat levels so such areas can be ventilated to reduce the chances of backdraft or flashover; to identify windows and doors in potentially blinding smoke conditions, thus allowing firefighters to rapidly vent a burning structure as they move through it; and to identify the movement of hazardous materials and identify product levels in containers within the burning structure.

Structurally, a portable thermal imager includes four primary components that are contained in a housing designed to be carried by an individual, e.g., a firefighter. First and foremost, the essential function of a thermal imager is carried out by a sensor (often referred to as a "camera") that reacts to infrared radiation, converting sensed thermal radiation (the "thermal picture") of an area into a visible thermal image in which, relative to the surrounding environment, hotter areas appear white while cooler areas appear black. One of two sensors is commonly used in portable thermal imagers: (1) a barium strontium titanate ("BST") detector developed by the Raytheon Company of Lexington, Mass.; or (2) a microbolometer with a vanadium oxide (VOx) or an amorphous silicon sensing material, such as the LTC500 MicroIR™ Imaging Camera manufactured and distributed by BAE Systems of Nashua, N.H.

The second primary component is a lens which focuses the thermal picture onto the sensor, specifically onto a focal plane array ("FPA") of independent pixels. The quality of the lens is a major factor in the quality of the resultant thermal image. One measure of quality is the f-number. A wider lens means a smaller f-number and increased image quality. Of course, the width of the lens is limited by weight and costs considerations. For this reason, a common lens provides a field of view up to approximately 60°, and a common material for lens construction is germanium.

The third primary component is the video display, the means by which the resultant thermal image is provided to the user. An active matrix liquid crystal display ("LCD") is commonly used in portable thermal imagers.

Finally, the fourth primary component is a power supply. A NiMH or similar rechargeable battery is commonly used in portable thermal imagers, although alkaline or other common batteries may be also used.

Again, each of the four above-described components is contained within (or otherwise secured to) a common housing. The housing protects the delicate sensing components, and indeed protects such components in even severe fire conditions. At the same time, common housings are designed to facilitate transport. In this regard, some portable thermal imagers are designed with a pistol grip that allows a firefighter to easily carry and aim the thermal imager; others are provided with straps that allow the thermal imager to be raised to the eyes much like binoculars. The underlying sensing and display technology of the thermal imager is well-developed and employed by various manufacturers.

As mentioned above, the lens is one of the primary components of a typical thermal imager and serves to focus the thermal picture onto the FPA of the sensor or camera However, the lens, which is often composed of germanium, is fragile and susceptible to breakage.

In prior art constructions, a lens typically is sealed on one or both of its broad faces with an O-ring or gasket. The lens and associated O-rings or gaskets are then compressed between a stationary outer wall of the thermal imager housing and another wall member or cap. However, should the impact to the wall member or cap be greater than can be absorbed by compressions of the O-rings or gaskets, the force may be translated to the lens, causing it to fracture or break. If the lens of the thermal imager is fractured or broken while in use, the imager can no longer properly function. Although the issue of the fragility of the lens is a recognized problem in the thermal imager industry, there has been no adequate solution that protects the lens during exposure in extreme environments.

It is therefore a paramount object of the present invention to provide a portable thermal imager with a shock-absorbing lens mount that protects the fragile lens from the forces of impact, such as when the thermal imager is dropped.

It is a further object of the present invention to provide a portable thermal imager with a shock-absorbing lens mount that is watertight even in severe heat and water conditions.

These and other objects and advantages of the present invention will become apparent upon a reading of the following description.

SUMMARY OF THE INVENTION

The present invention is a portable thermal imager with a shock-absorbing lens mount that minimizes the transfer of the impact forces to the fragile lens. Specifically, the lens of the portable thermal imager is encased within a circumferential grommet and then received in a cavity defined by the housing. In this regard, the housing defines a substantially circular opening therethrough which has a diameter that is less than that of the lens. A rim extends from the housing and circumscribes this opening, creating an annular ledge between the opening and the rim. The cavity is the cylindrical volume bounded by the rim.

When the lens and associated grommet are received in the cavity defined by the housing, the grommet is compressed along its circumferential edge against the internal wall of the rim, such that the lens is essentially suspended within the cavity. The lens itself does not contact the internal wall or the rim or any other portion of the housing.

The annular ledge serves to prevent the lens from being forced inside of the housing in the event of an especially large impact to the thermal imager. Similarly, to prevent the lens from being dislodged from the cavity in the opposite direction, a cap or bezel is secured to the rim of the housing over the lens.

Because of the construction described above, should the front end of the thermal imager be impacted, the bezel absorbs the forces of impact, translating such forces to the housing of the thermal imager. Since the lens is essentially suspended between the housing and the bezel, little or no force resulting from an impact to the thermal imager is translated to the lens.

DESCRIPTION OF THE INVENTION

The present invention is a portable thermal imager with a shock-absorbing lens mount that protects the fragile lens from forces of impact.

Figure 1:
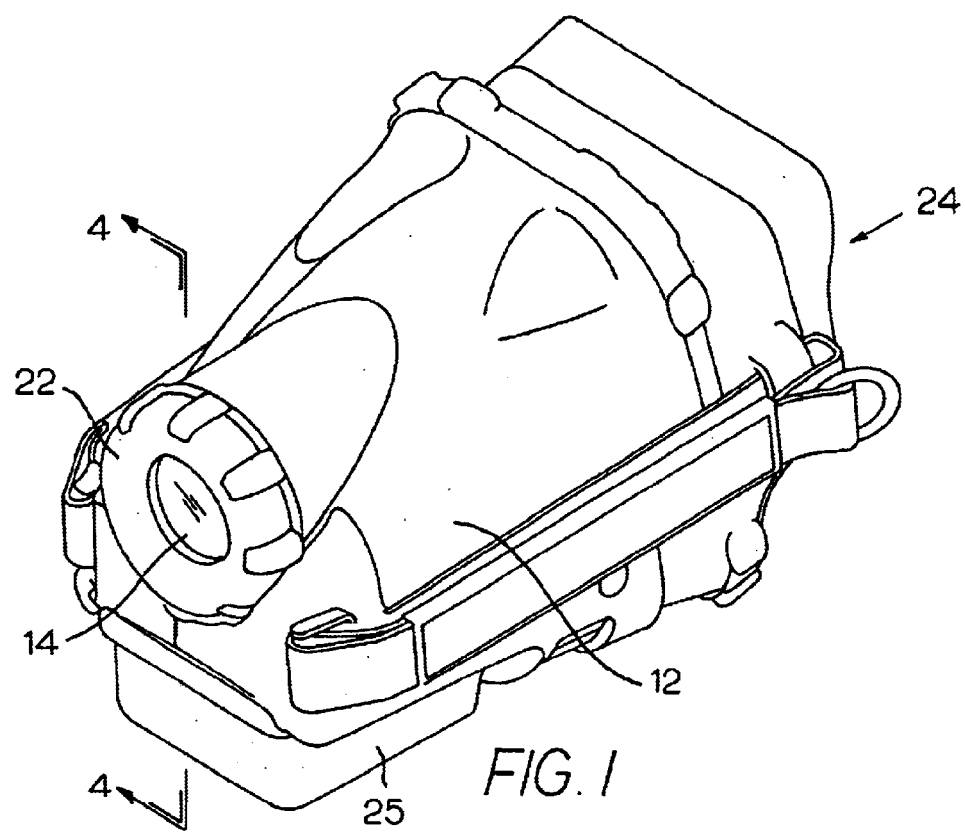
FIG. 1 is a perspective view of a portable thermal imager in accordance with the present invention.
Figure 2:
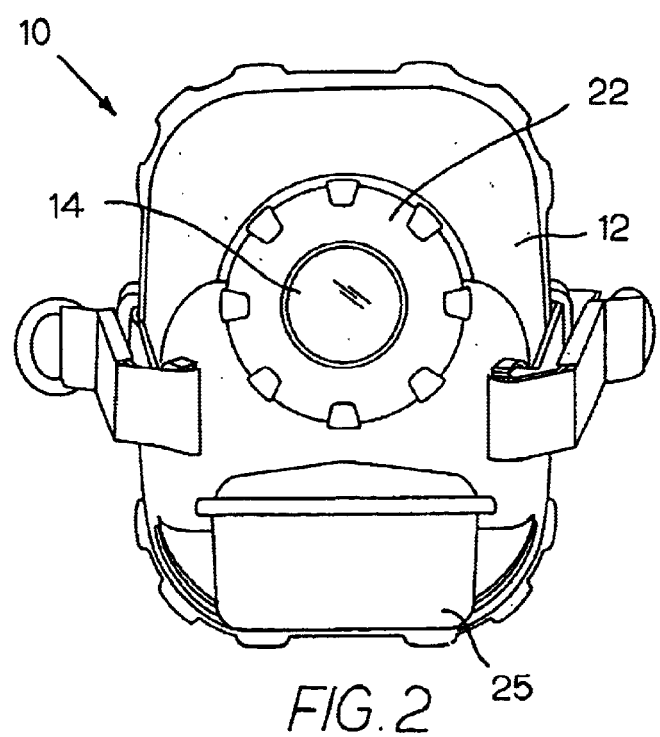
FIG. 2 is a front view of the preferred portable thermal imager of FIG. 1.

FIGS. 1–2 are a perspective and a front view of a portable thermal imager 10 in accordance with the present invention. As shown in FIGS. 1–2, the preferred portable thermal imager 10 has four primary components contained within or otherwise secured to a molded housing 12: a sensor (not shown) which is contained within the housing 12; a video display 24 secured to the housing 12 and operably connected to the sensor for displaying a visible thermal image on the video display 24; a lens 14 that focus infrared radiation onto the sensor, and a battery pack or similar power supply 25. in the preferred embodiment of the thermal imager 10 described herein, the housing 12 is made of a thermoplastic, such as a thermoplastic manufactured and distributed by the General Electric Company of Pittsfield, Mass. under the trademark ULTEM, tested to withstand temperatures of 650° F. for up to 5 minutes. Of course, various other thermoplastics or similar materials could be used to construct the housing 12 of the thermal imager 10 without departing from the spirit and scope of the present invention.

Figure 3:
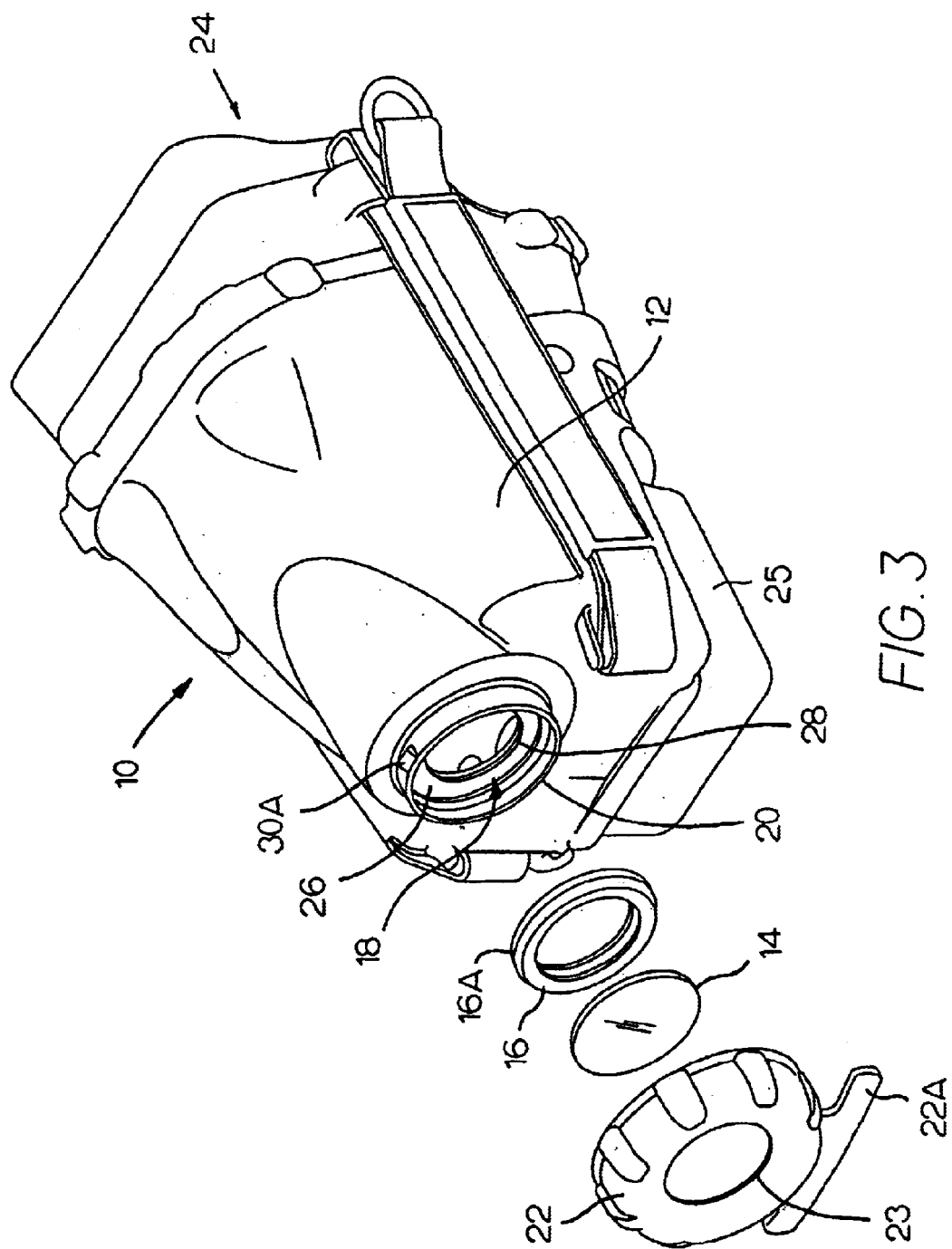
FIG. 3 is a partial exploded perspective view, illustrating the components of the shock-absorbing lens mount of the portable thermal imager of FIG. 1.
Figure 4:
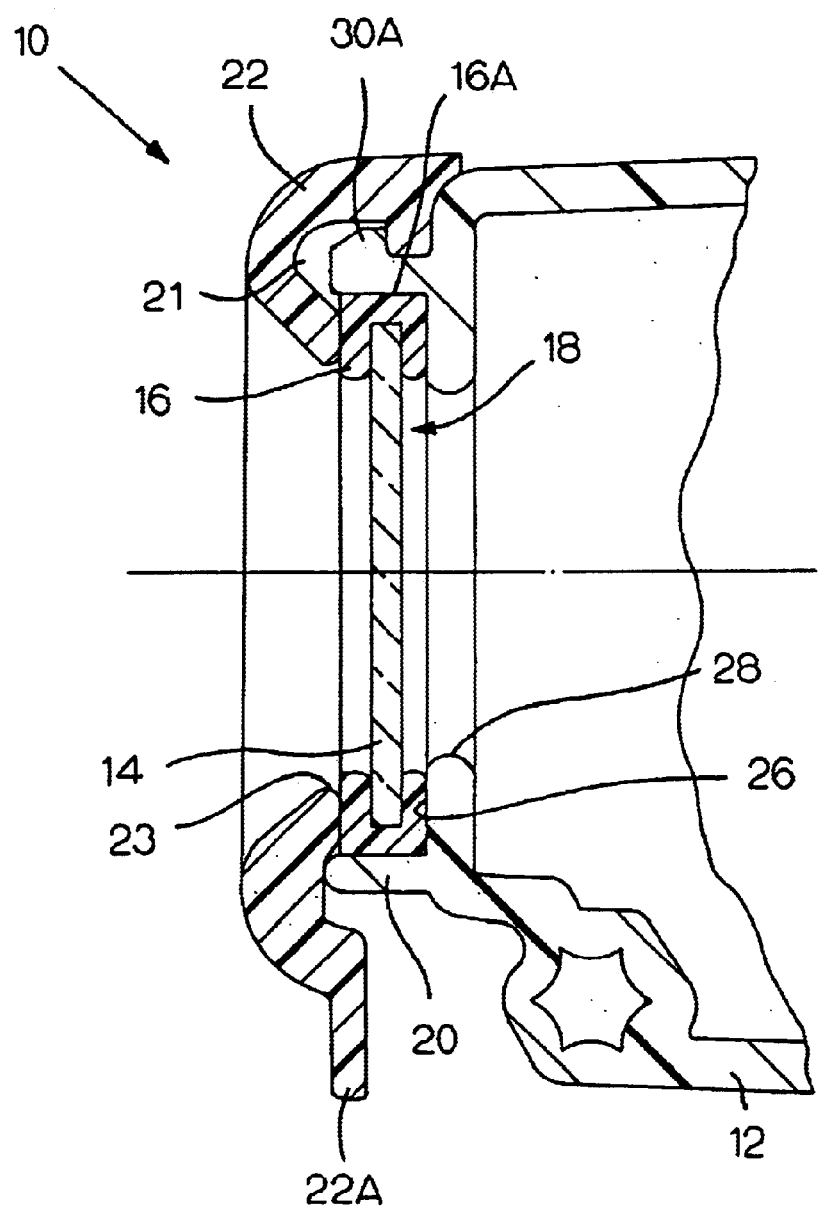
FIG. 4 is a sectional view of the shock-absorbing lens mount of the preferred portable thermal imager of FIG. 1 taken along line 4—4 of FIG. 1.

Referring now to the detailed views of the preferred portable thermal imager 10 of FIGS. 3 and 4, to protect the fragile lens 14 (commonly constructed of germanium) of the thermal imager 10 from forces of impact, a shock-absorbing lens mount is used to minimize the transfer of the impact forces to the fragile lens. Specifically, the lens 14 is encased within a circumferential grommet 16 and then received in a cavity 18 defined by the housing 12. In this regard, the housing 12 defines a substantially circular opening 28 therethrough which has a diameter that is less than that of the lens 14. A rim 20 extends from the housing 12 and circumscribes this opening 28, creating an annular ledge 26 between the opening 28 and the rim 20. The cavity 18 is the cylindrical volume bounded by the rim 20.

When the lens 14 and associated grommet 16 are received in the cavity 18 defined by the housing 12, the grommet 16 is compressed against the internal wall 20A of the rim 20, such that the lens 14 is essentially suspended within the cavity 18. The lens 14 itself does not contact the internal wall 20A of the rim 20 or any other portion of the housing 12. In this regard, the grommet 16 must allow for some compression, and therefore is preferably made of silicone or a similar flexible material. In the preferred embodiment illustrated in the accompanying Figures, the grommet 16 has an elevated ridge 16A that extends from the grommet 16 about the circumferential edge thereof. When the lens 14 and associated grommet 16 are received in the cavity 18, the elevated ridge 16A of the grommet 16 is the portion of the grommet 16 that is actually compressed against the internal wall 20A of the rim 20.

As mentioned above, the lens 14 is essentially suspended within the cavity 18, but the lens 14 itself does not contact any portion of the housing 12. The annular ledge 26 serves to prevent the lens 14 from being forced inside of the housing 12 in the event of an especially large impact to the thermal imager 10. Similarly, to prevent the lens 14 from being dislodged from the cavity 18, a cap or bezel 22 is secured to the rim 20 of the housing 12 over the lens 14. Of course, to allow the lens 14 to function as intended (i.e., to focus the thermal picture onto the sensor), the bezel 22 has an annular shape with a central opening 23. Also, similar to the housing 12, the bezel is preferably made a thermoplastic, such as a thermoplastic manufactured and distributed by the General Electric Company of Pittsfield, Mass. under the trademark ULTEM, or a similar material.

To secure the bezel 22 to the housing 12, in the preferred embodiment of the thermal imager 10 described herein, the bezel 22 has an integral horizontal bar 22A extending from the lower portion thereof. When the housing 12 of the portable thermal imager 10 is assembled, this integral horizontal bar 22A is enclosed within this housing 12, as shown in FIGS. 1 and 2. Furthermore, referring again to FIGS. 3 and 4, the preferred housing 12 has an integral tab 30A extending from the outer surface of the circumferential rim 20. This tab 30A is adapted to mate with a corresponding aperture 21 defined along the inner surface of the bezel 22 and thus allows the top portion of the bezel 22 to be snap-fit to the housing 12.

Because of the construction described above, should the front end of the thermal imager 10 be impacted, the bezel 22 absorbs the forces of impact, translating such forces to the housing 12 of the thermal imager 10. Since the lens 14 is essentially suspended between the housing 12 and the bezel 22, little or no force resulting from an impact to the thermal imager 10 is translated to the lens 14.

It will be obvious to those skilled in the art that further modifications may be made to the embodiments described herein without departing from the spirit and scope of the present invention.

What is claimed is:

1. A portable thermal imager, comprising:

a housing;

a sensor contained within said housing that reacts to infrared radiation, converting sensed radiation into a visible thermal image;

a video display secured to said housing and operably connected to said sensor for displaying said visible thermal image; and a lens that focuses infrared radiation onto said sensor, said lens being encased within a circumferential grommet and received in a cavity bounded by a rim extending from said housing, said grommet being compressed against an internal wall of said rim.

2. A portable thermal imager as recited in claim 1, wherein said grommet has an elevated ridge that is compressed against the internal wall of said rim.

3. A portable thermal imager as recited in claim 1, wherein said rim circumscribes an opening through said housing into the interior of said housing.

4. A portable thermal imager as recited in claim 3, wherein an annular ledge is defined between said opening and said rim, said annular ledge preventing said lens from being forced through the opening into the interior of said housing.

5. A portable thermal imager as recited in claim 1, and further comprising a bezel secured to said housing to prevent the dislodgment of said lens and associated grommet from said housing.

* * * * *